United States Patent
Beck et al.

[11] 3,885,044
[45] May 20, 1975

[54] CHLOROTHIANTHRENES

[75] Inventors: Gunther Beck, Leverkusen; Hans Holtschmidt, Leverkusen-Steinbuechel, both of Germany

[73] Assignee: Bayer Aktiengesellschaft, Leverkusen, Germany

[22] Filed: May 30, 1973

[21] Appl. No.: 365,351

[30] Foreign Application Priority Data
June 15, 1972  Germany.............................. 2229162

[52] U.S. Cl................ 260/327 P; 252/45; 252/406; 424/277
[51] Int. Cl............................................ C07d 73/02
[58] Field of Search.................................. 260/327 P

[56] References Cited
OTHER PUBLICATIONS
Lovelace, Aliphatic Fluorine Compounds (Reinhold, N.Y. 1958) pp. 332–333.
Cohen et al., Chem. Commun., 1967(9) 451–453.

*Primary Examiner*—Henry R. Jiles
*Assistant Examiner*—C. M. S. Jaisle
*Attorney, Agent, or Firm*—Burgess, Dinklage & Sprung

[57] ABSTRACT
Chlorothianthrenes are prepared by reacting polychlorobenzene compounds having the formula

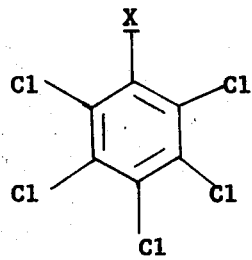

wherein X is Cl, —CN or —NCO, with sulphur at a temperature in the range of from 250° to 500°C. The chlorothianthrenes have the formula

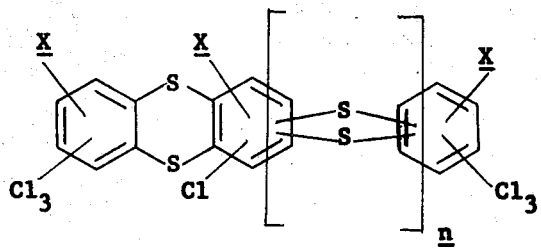

wherein X and $n$ are defined in the description herein.

2 Claims, No Drawings

CHLOROTHIANTHRENES

This invention relates to certain chlorothianthrenes and to a process for their production.

SUMMARY

The present invention provides a process for the preparation of chlorothianthrenes which comprises reacting polychlorobenzene compounds corresponding to the formula (I)

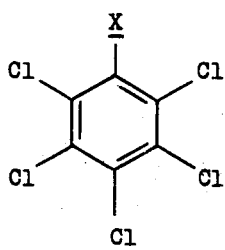

(I)

wherein X is Cl, —CN or —NCO,
with sulphur at a temperature in the range of from 250° to 500°C.

The reaction is preferably carried out at a temperature in the range of from 300° to 350°C.

Compounds obtained by the process according to the invention correspond to the general formula (II)

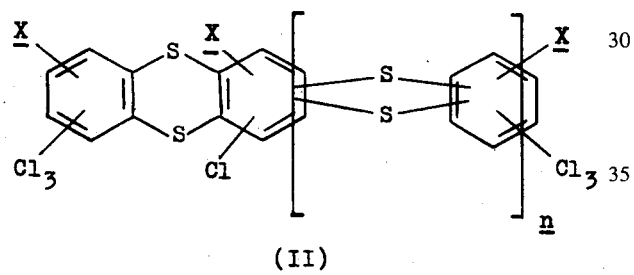

(II)

wherein
X is Cl, —CN or —NCO, and
$n$ is 0, 1 or 2,
with the proviso that when X is Cl, $n$ is 1 or 2, that when X is —CN, $n$ is 0 or 1 and that when X is —NCO, $n$ is 0.

DESCRIPTION

The process according to the invention is illustrated with reference to the following example:

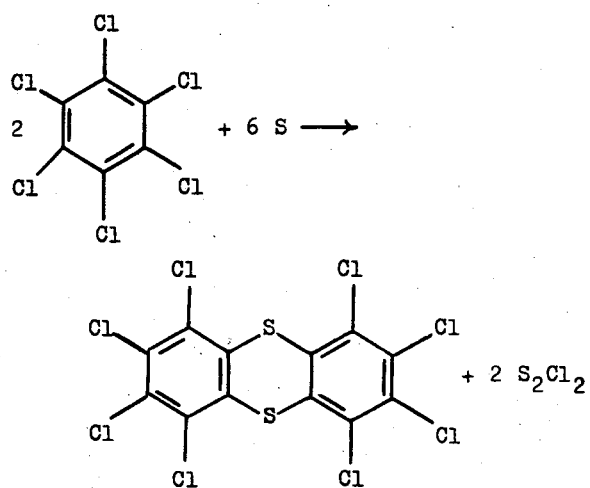

For the reaction giving the chlorothianthrene of formula (II) in which X represents Cl and $n$ is 0, the sulphur has to be used in a quantity of about 3 mols per mol of the starting compound. For the reaction by which the next highest homologue of formula (II), in which X represents Cl and $n$ is 1, is formed, it is theoretically necessary to use 4 mols of sulphur per mol of starting compound in accordance with the following equation:

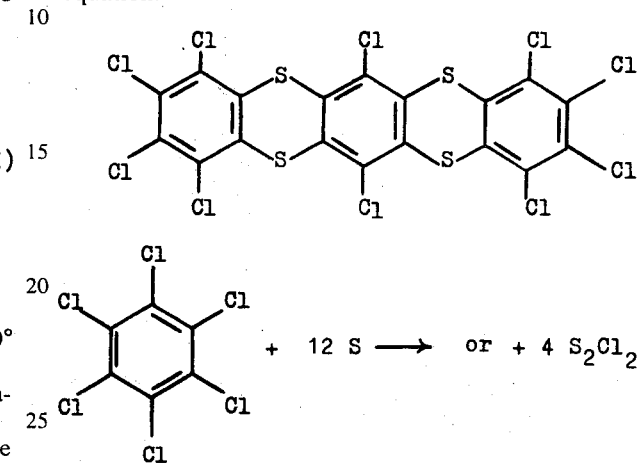

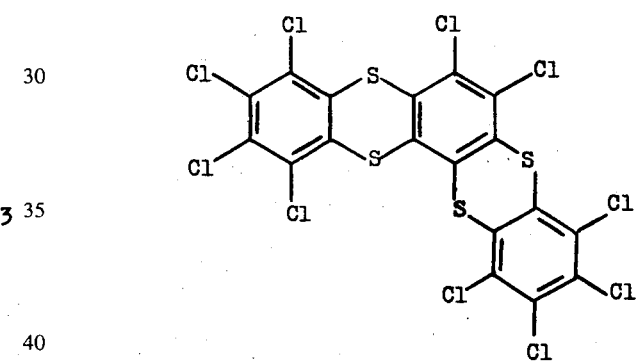

where X represents Cl and $n$ is 2,
it is necessary theoretically to use 4.5 mols of sulphur per mol of starting compound for the exclusive formation of $S_2Cl_2$.

However, it has been found that these molar ratios of 4 and 4.5 are not of crucial importance and that, in almost every case, a mixture of products consisting predominantly of the compounds (II) in which $n$ is 0

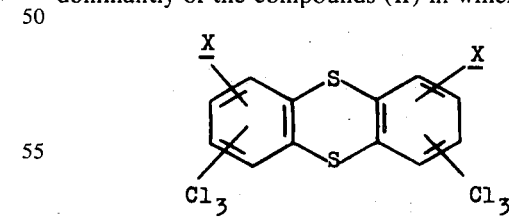

in which X is as previously defined is formed.

Where X represents —NCO, it is solely the tricyclic compound (II) in which $n$ is 0 that is formed. In cases where X represents —CN, between about 5 and 10 percent of the pentacyclic compound (II) in which $n$ is 1 are formed in addition ot the tricyclic compound (II) in which $n$ is 0. It is only in cases where X represents Cl that the proportion by weight of pentacyclic compound in which $n$ is 1, based on the total quantity of (II), can amount to from about 30 to 40 percent, and the proportion by weight of heptacyclic compound in which n is 2 can amount to from about 5 to 10 percent.

In the process according to the invention, therefore, generally no more than the quantity of sulphur which is stoichiometrically required to form the tricyclic compounds (II) in which n is 0 accumulating as the main products, namely about 3 mols of sulphur, is used per mol of starting compound. It is of course also possible to use other molar ratios of starting compound to sulphur and, in this case, optionally to return the particular excess component to the reaction circuit. In order to avoid any undesirable further reactions involving already formed reaction products (II) (for example into higher molecular weight products richer in sulphur or insoluble and unsublimatable, for example of the type (II) in which n is greater than 2), it can be advisable considerably to reduce the quantity of sulphur stoichiometrically required to form the tricyclic compounds (II) in which n is 0, namely about 3 mols of sulphur per mol of starting compound (I), for example to half or to one third.

The starting compounds used for the process according to the invention, namely hexachlorobenzene, pentachlorobenzonitrile and pentachlorophenyl isocyanate, are known compounds.

To carry out the process according to the invention, one of the starting compounds (I) is mixed with from about 1 to 3 mols of sulphur and the resulting mixture is heated, preferably in an inert gas such as nitrogen or argon, to the reaction temperature, preferably to between 300° and 350°C.

The reaction can be carried out either in an open or closed reaction vessel. In cases where the reaction is carried out in a closed vessel, for example an autoclave or a bomb tube, the starting components are heated to temperatures in the aforementioned range and the disulphur dichloride formed is separated off, for example by fractional distillation, after cooling. Any fractions of unreacted starting products still present are best separated off from the reaction products by fractional vacuum sublimation or distillation. In cases where the reaction is carried out in an open vessel, it is best to continuously distill off the sulphur chlorides formed in order to be able to keep the reaction temperature at the necessary level. The reaction is over when practically no more sulphur chlorides distill over. The reaction time generally amounts to from 1 hour to 20 hours, depending upon the size of the batch and on the reaction temperature.

In order to avoid any undesirable further reactions involving already formed reaction products (II), it is advisable to terminate the reaction at a conversion of less than 1 (for example 0.5 to 0.8), for which purpose the conversion can readily be determined as an approximate value through the quantity of disulphur dichloride distilled off. In this case, the starting compounds present, if any, are separated off from the reaction products (II) by fractional vacuum sublimation or by distillation, as described above, and optionally returned to the reaction circuit.

In cases where, for the reasons explained above, a deficit of sulphur is used, the effect which this produces can best be further intensified by adding the sulphur in small portions to the starting product (I) over the reaction time, rather than mixing it with the starting product (I) at the beginning of the reaction.

Isolation of the chlorothianthrenes corresponding to formula (II) in pure form is carried out by any of the methods commonly used in organic chemistry, for example by vacuum sublimation, crystallisation (for example from benzene, chlorobenzene, 1,2,4-trichlorobenzene, tetrahydronaphthalene), or by chromatography. Separation of the compounds (II) in which X represents Cl and n represents 0, 1 and 2, and of those compounds in which n represents —CN and n represents 0 and 1, can readily be carried out by fractional vacuum sublimation by virtue of the considerable differences in their relative molecular weights. The tricyclic compounds (II) ($n = 0$) can be sublimated at a temperature of about 250° to 300°C, the pentacyclic compounds ($n = 1$) at about 400° to 450°C and the heptacyclic compound ($n = 2$) at about 550° to 600°C, in each case in an oil pump vacuum (approximately 0.1 Torr). Also, the tricyclic compounds (II) ($n = 0$) can be separated off from the higher molecular weight compounds (II) in which $n = 1$ and 2 by extraction by virtue of their relatively higher solubility in organic solvents (for example benzene, chlorobenzene, toluene and o-dichlorobenzene).

The process is generally carried out in the absence of solvents, however, it can also be carried out in the presence of organic solvents which boil at temperatures in the range used and which are inert with respect to the reactants, for example methyl naphthalenes, chloronaphthalenes, diphenyl and the like. The process can of course also be carried out continuously.

Octachlorothianthrene, which can be made by the process of the invention, has been made in other ways (cf. DAS 1,123,663 and DAS 1,222,508, also Chem. Ind. [London], 1965, page 302) and has the formula

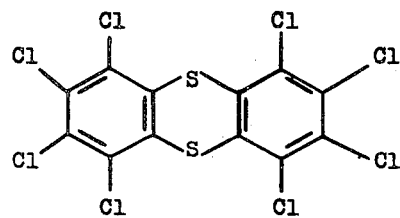

Other compounds (II) obtained by the process according to the invention are new and represent valuable intermediate products for the production of plant protection agents, dyes and polymers. They can be used as plasticisers, especially in admixture with chlorine-containing high polymers, as pesticides, as flame-proofing agents, as lubricant additives, as anti-oxidants and as vulcanisation accelerators. They are also suitable for use as intermediate products for the production of pesticides and chlorine-containing dicarboxylic acid and polycarboxylic acids (cf. German Pat. No. 1,123,663 which corresponds to U.S. Pat. No. 3,217,044 and G.B. Pat. No. 982,588).

It must be regarded as extremely surprising that, despite the high reaction temperature, defined predominantly new compounds can be obtained by the process according to the invention.

EXAMPLE 1

285 g (1 mol) of hexachlorobenzene and 96 g (3 mols) of sulphur were mixed and kept at a bath temperature of 325°C in a three-necked flask equipped with stirring mechanism, thermometer and distillation bridge by means of a metal bath under an inert gas (nitrogen or argon). After about 5.5 hours, some 70 g of sulphur chlorides (predominantly disulphur dichloride) had formed. The residue was heated in a sublimation apparatus to 180° to 200°C/14 Torr until all the starting materials had been sublimated out. Beginning at about 250°C/0.1 Torr, the resulting crude product was subjected to fractional sublimation up to a final temperature of about 550° to 600°C. Residue 20 g. The 76 g of total sublimate were distributed as follows:

1. 45 g of the compound $C_{12}Cl_8S_2$. Elemental composition and molecular weight were confirmed by the mass spectrum. The infra-red spectrum proved the identity of this compound compared with octachlorothianthrene known from the literature:

Structure:

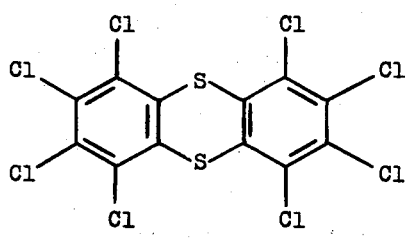

m.p. 414° to 416°C (from tetralin).

2. 27 g of the compound $C_{18}Cl_{10}S_4$. Elemental composition and molecular weight were confirmed by the mass spectrum.

Structure:

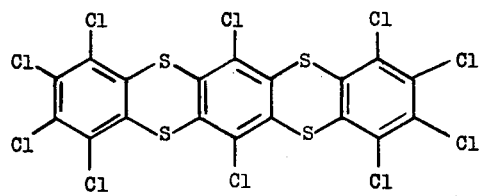

or

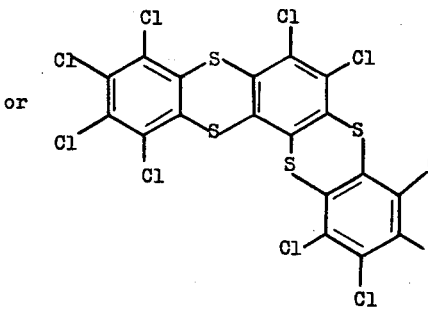

The linear structure would seem to be more probable on the basis of the IR-spectrum. Since this compound did not melt at temperatures of up to 450°C, the 8 most intensive bands of the infra-red spectrum (in cm$^{-1}$) are quoted for further characterisation: 1334, 1290, 1110, 1102, 878, 740, 729, 683.

3. Approximately 4 g of the compound $C_{24}Cl_{12}S_6$. Elemental composition and molecular weight were confirmed by the mass spectrum.

Structure:

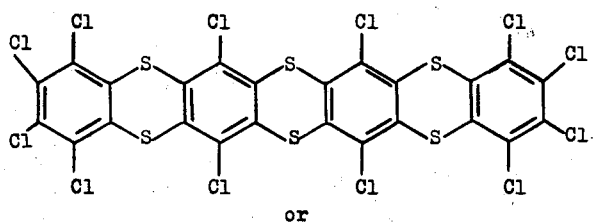

or

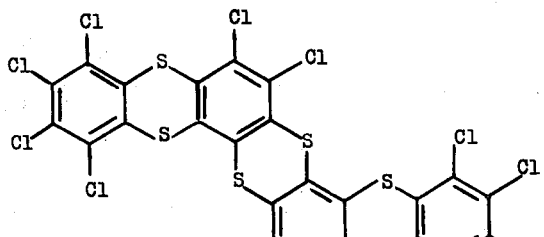

or

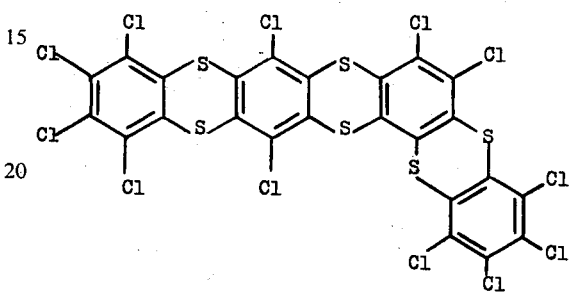

or

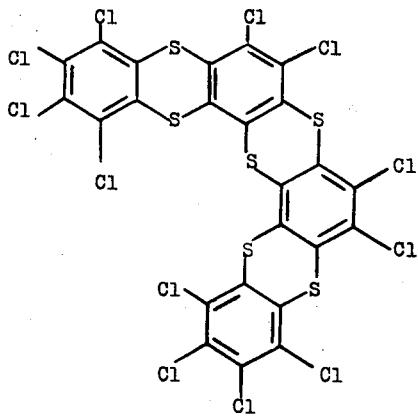

The linear structure would seem to be most probable on the basis of the IR-spectrum. Since the compound does not melt at temperatures of up to 450°C, the 7 most intensive bands of the IR-spectrum are quoted (in cm$^{-1}$) for further characterisation: 1336, 1330, 1290, 1110, 878, 737, 684.

EXAMPLE 2

285 g (1 mol) of hexachlorobenzene and 32 g (1 mol) of sulphur were reacted as described in Example 1. About 40 g of predominantly disulphur dichloride formed after about 5.5 hours at a bath temperature of 325°C. Working up of the crude product mixture by fractional high-vacuum sublimation was carried out as in Example 1. Residue 6 g. Total sublimate 63 g. The three compounds described in Example 1 were again obtained, their relative proportions corresponding substantially to those of Example 1.

EXAMPLE 3

A three-necked flask equipped with a stirring mechanism, thermometer and distillation bridge was filled with 55 g (0.2 mol) of pentachlorobenzonitrile and subsequently placed in a metal bath at 340° to 350°C. 10 g (0.312 mol) of sulphur were then added in portions over a period of 4 hours in the absence of air. On completion of the addition, the flask was kept at the bath temperature of 340° to 350°C for about another 30 minutes. The residue was freed from the starting materials by fractional sublimation as described in Example 1 and subsequently sublimated up to about 500°C/0.1 Torr. Residue 2.5 g. 16 g of sublimate corresponding to the formula (II), in which X represents —CN and $n = 0$ or 1, were obtained. About 15 g were soluble in boiling chlorobenzene and represent a compound with the summation formula $C_{14}Cl_6N_2S_2$ and the structure

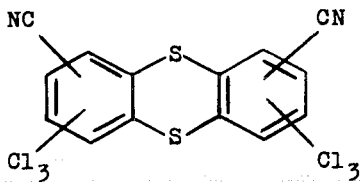

which crystallised out on cooling. Elemental composition and molecular weight were confirmed by the mass spectrum. The hexachloro-X, X'-dicyanothianthrene had still not melted at a temperature of 365°C. The 10 most characteristic bands of the IR-spectrum are quoted (in cm$^{-1}$) for further characterisation: 2230, 1525, 1335, 1310, 1240, 1210, 1135, 930, 880, 705.

The residue of about 1 g which is substantially insoluble in chlorobenzene represents a compound with the summation formula $C_{21}Cl_7N_3S_4$. Elemental composition and molecular weight were confirmed by the mass spectrum.

Structure:

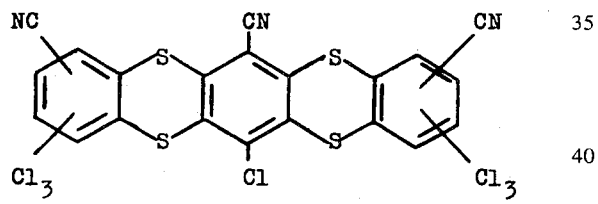

(more probable)

or

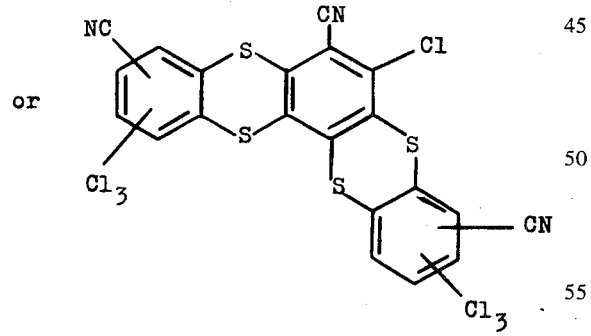

Melting point above 400°C. The 10 most characteristic IR-bands are as follows (in cm$^{-1}$): 2490, 2235, 1528, 1335, 1245, 1212, 1138, 935, 882, 710.

EXAMPLE 4

In an apparatus of the kind used in Example 3, 32 g (1 mol) of sulphur were added to 291.5 g (1 mol) of pentachlorophenyl isocyanate in an argon atmosphere over a period of 1.5 hours at a metal bath temperature of from 345° to 350°C. The mixture was then stirred for another 30 minutes at the same bath temperature, by which time about 43 g of sulphur chlorides (predominantly disulphur dichloride) had formed. Most of the excess pentachlorophenyl isocyanate was carefully separated off from the reaction product by fractional distillation in an oil pump vacuum (about 0.1 Torr) up to a bath temperature of about 250°C. The residue was then heated to a bath temperature of about 350°C in a sublimation apparatus under about 0.1 Torr. The compound $C_{14}Cl_6N_2O_2S_2$, hexachloro-X,X'-diisocyanato thianthrene was obtained in a yield of 29 g (34.5 percent of the theoretical yield, based on the sulphur used), crystallising from benzene or chlorobenzene in the form of long, thin colourless needles melting at 264.5° to 265.5°C. Elemental composition and molecular weight were confirmed by the mass spectrum. Structure:

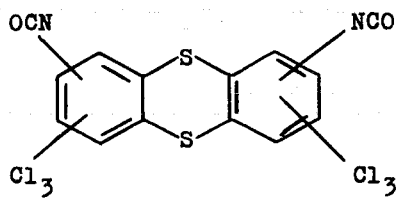

What is claimed is:
1. Chlorothianthrene selected from the group of

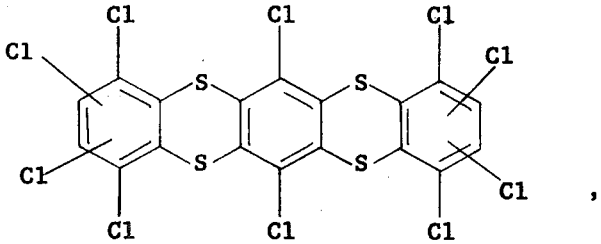

,

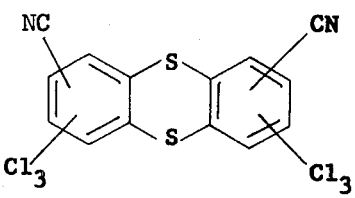

,

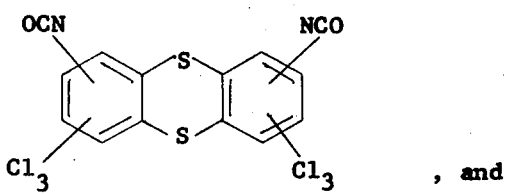

, and

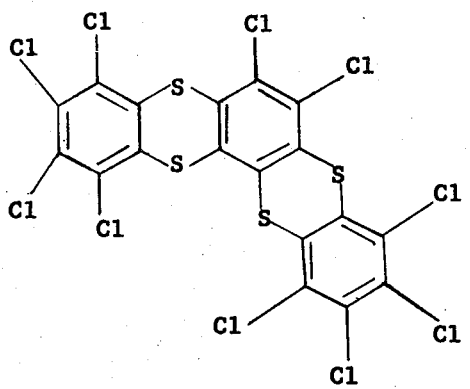

2. Chlorothianthrene selected from the group of
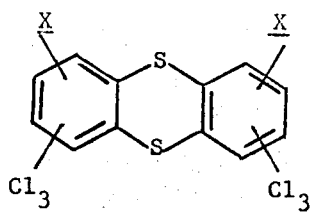
wherein X is —CN or —NCO,
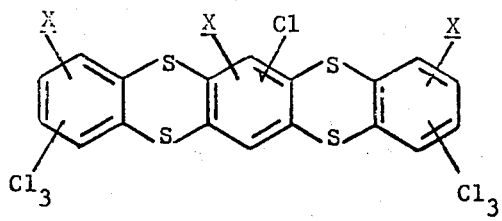
wherein X is Cl or CN,
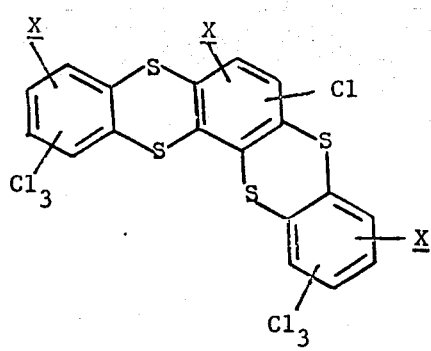
wherein X is Cl or CN,
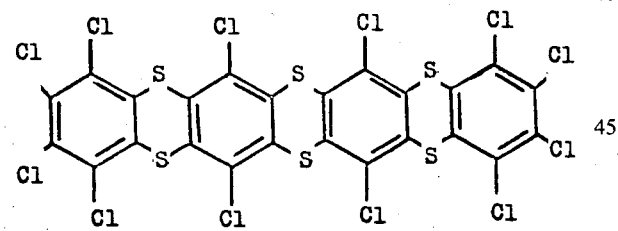
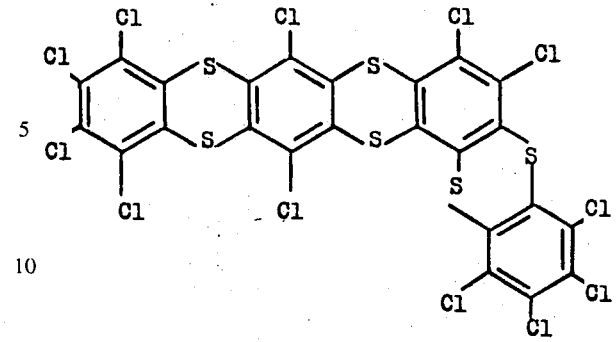
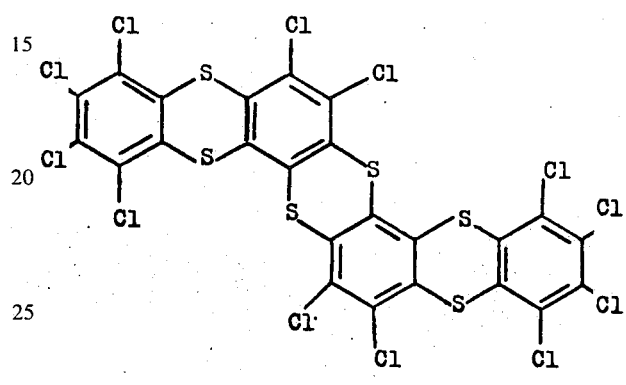
and
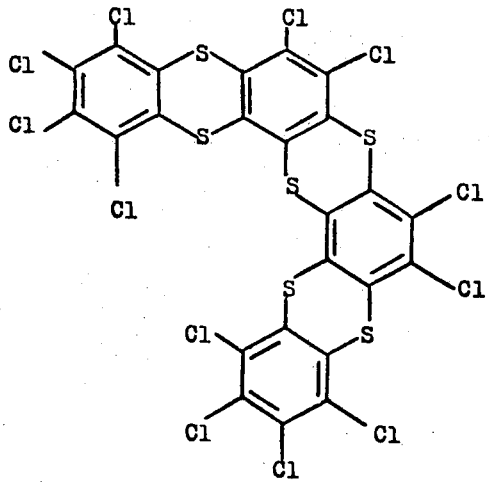
* * * * *